United States Patent Office 3,565,672
Patented Feb. 23, 1971

3,565,672
METHOD OF IMPROVING RESISTANCE TO CORROSION OF METAL SURFACE AND RESULTANT ARTICLE
Ben E. Adams, Carlsbad, N. Mex., assignor to Continental Oil Company, Ponca City, Okla., a corporation of Delaware
No Drawing. Filed May 8, 1968, Ser. No. 729,875
Int. Cl. B32b 15/04; B44d 1/14
U.S. Cl. 117—75                             25 Claims

ABSTRACT OF THE DISCLOSURE

This disclosure relates to a method of improving resistance to corrosion of metal surfaces, wherein the method comprises:
(a) applying to the metal surface a grease-like composition consisting essentially of a nonvolatile diluent, an oil-soluble dispersing agent, and a basic alkaline earth metal compound, and
(b) applying to the coated metal surface a conventional paint.

An important feature is the use of the particular grease-like composition as a primer coating.

DISCLOSURE

Background

The use of surface coatings (e.g. paint) to protect metals from corrosion is well-known. Usually, the corrosion protection is due more to the use of particular primers than to the paint itself. While most of the surface coatings of the prior art afford a satisfactory degree of protection, they have the disadvantage that the surface requires a relatively high degree of preparation prior to the application of the primer. The high cost of the labor used in preparing the surface makes the total job of coating the metal surface quite expensive.

It is thus apparent that it would be highly desirable to have a primer which affords good corrosion protection and yet requires only a minimum amount of preparation of the metal surface prior to application. The present invention concerns a method of coating metal surfaces which method uses a primer meeting these requirements.

Prior art

U.S. Patent 3,242,079, to Richard L. McMillen, teaches a grease composition which is useful as a corrosion inhibitor for metal surfaces. The grease composition is prepared by treating a fluid mineral oil solution of a carbonated, basic alkaline earth metal salt of an acid (e.g. an oil-soluble sulfonic acid) with an active hydrogen compound (e.g. acetic acid or an alcohol-water mixture). The patent does not teach that such a composition can be used as a primer in the coating of metal surfaces with conventional paints.

Heretofore the use of soaps or greases as primers in the application of paints has been unsatisfactory. The paint either fails to dry at all or the adhesion of the paint to the metal surface is poor, thereby causing blistering, cracking, or flaking of the paint. These harmful effects are related to the bleeding of petroleum oils from the greases.

Brief summary of the invention

Briefly, the present invention concerns a method of improving the resistance to corrosion of metal surfaces wherein the method comprises:
(a) Applying to the metal surface a grease-like composition consisting essentially of a nonvolatile diluent, oil-soluble dispersing agent, and basic alkaline earth metal compound, and
(b) Applying to the coated metal surface a conventional paint.

The grease-like composition applied in step (a), preferably, should be substantially free of volatile solvents before applying the paint in step (b).

Still further, the grease-like composition consists essentially of from about 2 to about 80 parts by weight of a nonvolatile diluent, from about 5 to about 55 parts by weight of an oil-soluble dispersing agent, and from about 1 to about 45 parts of a basic alkaline earth metal compound, said composition being characterized further in that it has an acetic base number of at least 50, a dropping point of at least 480° F., does not flow at 210° F., and is thixotropic.

In another aspect, the present invention concerns a metal article having improved resistance to corrosion, said metal article having the exterior surface coated with the grease-like composition, described in the foregoing, as the primer coat and a conventional paint as the external coat.

In a further aspect, the present invention concerns the use of the grease-like composition as a primer coating when used in conjunction with conventional paints on any of the surfaces normally coated by conventional paints.

Detailed description

Prior to describing in detail the grease-like composition of my invention, which is useful as a primer, it may be better to describe the methods of preparing the composition. In so doing, I will describe the nature of the materials present in the composition.

Basically, there are two general methods of preparing the composition. The first method is called simply a "two-step" method. According to this method, a colloidal dispersion of a basic alkaline earth metal compound is formed first. The dispersion is then treated, preferably, with a small amount of water in the presence of a small amount of alcohol. The second method is called simply a "one-step" method. According to this method, an admixture is formed of oil-soluble dispersing agent, nonvolatile diluent, alkaline earth metal compound, alcohol, and water. After treating the admixture with $CO_2$, the volatile materials are removed by distillation. The two-step method will be described in detail first.

Two-step method of preparation

Starting materials.—The charge (or starting) material for this method of preparing the grease-like composition is a colloidal dispersion of a basic alkaline earth metal compound having an acetic base member of at least 50. The term "alkaline earth metal" as used herein refers only to those which are more commonly available, namely, magnesium, calcium, strontium and barium. Of these, calcium and barium are more suitable, with calcium being preferred.

The term "basic" metal compound means that the anion can be carbonate, hydroxide, or mixtures of these, but, preferably is carbonate.

Many processes are known for preparing colloidal dispersions of basic alkaline earth metal compounds. Also, several processes are known for preparing colloidal dispersions of basic alkaline earth metal compounds, wherein the basic metal compound is formed in situ in the presence of the dispersing agent. It is characteristic of the products prepared by the in situ method that they have a uniform and small (i.e., 0.25 micron or less, and usually 0.10 micron or less) particle size.

The following U.S. patents are concerned with the preparation of colloidal dispersions, wherein the basic metal compound is formed in situ: U.S. 3,150,089, to Mack W. Hunt, which issued Sept. 22, 1964 and is entitled "Highly Basic Magnesium-Containing Additive Agent," U.S. 3,150,088, to Mack W. Hunt et al., which issued Sept. 22, 1964 and is entitled "Highly Basic Calcium-Containing Additive Agent"; U.S. 2,956,018 to Robert L. Carlyle et al., which issued Oct. 11, 1960 and is entitled "Metal Containing Organic Compositions and Method of Preparing the Same"; U.S. 2,937,991, to Robert L. Carlyle, which issued May 24, 1960 and is entitled "Method of Dispersing Calcium Carbonate in a Non-Volatile Carrier"; and U.S. 2,895,913, to Robert L. Carlyle et al., which issued on July 21, 1959 and is entitled "Magnesium Containing Organic Compositions and Method of Preparing the Same."

The preceding patents are made a part of this disclosure.

The colloidal dispersions which are used as a starting material consist essentially of a nonvolatile diluent, an oil-soluble dispersing agent, and a basic alkaline earth metal compound as hereinbefore described. These materials are present in the following range:

|  | Parts by weight | |
|---|---|---|
|  | Suitable | Preferred |
| Nonvolatile diluent | 2-80 | 30-60 |
| Dispersing agent | 5-55 | 15-30 |
| Basic alkaline earth metal compound | 1-45 | 3-35 |

In addition to the nonvolatile diluent, oil-soluble dispersing agent, and basic metal compound, the colloidal dispersions may contain minor amounts of the alcohol which is employed in manufacturing the colloidal dispersion, and of the metal-containing intermediate which may be employed in manufacturing the colloidal dispersion.

A wide variety of nonvolatile diluents are suitable in the colloidal dispersions used as the starting material. The principal requisite desired in the nonvolatile diluent is that it will act as a solvent for the dispersing agent which is used. Examples of nonvolatile diluents which can be used include mineral lubricating oils obtained by any of the conventional refining procedures; liquid synthetic lubricating oils, such as polymers of propylene, polyoxyalkylenes, polyoxypropylene, dicarboxylic acid esters, and esters of acids of phosphorous; vegetable oils, such as corn oil, cotton seed oil, and castor oil; animal oils, such as lard oil and sperm oil; and waxes, such as natural and petroleum waxes. Of the waxes, the microcrystalline waxes are preferred. Of the oils in the preceding examples, the mineral lubricating oils are preferred.

It should be noted that when a wax is used as the nonvolatile diluent, the colloidal dispersion is a solid at room temperature.

A variety of oil-soluble dispersing agents are suitable in the colloidal dispersions which are used in preparing the product used in my invention. Generic examples of suitable dispersing agents include oil-soluble sulfonic acids, carboxylic acids, phosphorus sulfide-treated olefins and the metal salts thereof. The preferred dispersing agents for preparing the grease-like product used in my invention, are the oil-soluble sulfonic acids and metal sulfonates.

The term "metal" as used in "metal sulfonates," refers to those metals which are conventionally used to prepare the metal sulfonates of commerce. This includes metal sulfonates wherein the metal is sodium, potassium, magnesium, calcium, and barium. The more suitable sulfonates are those wherein the metal is calcium or barium. Preferably, the metal of the metal sulfonate is the same as the metal of the basic metal compound.

The term "oil-soluble sulfonates," as used herein, refers to those sulfonates wherein the hydrocarbon portion of the molecule has a molecular weight in the range of about 300 to about 1000. Preferably, this molecular weight is in the range of about 370 to about 700. These oil-soluble sulfonates can be either synthetic sulfonates or the so-called mahogany or natural sulfonates. The term "mahogany sulfonates" is believed to be well understood, since it is amply described in the literature. The term "synthetic sulfonates" refers to those sulfonates which are derived from sulfonation feed-stocks which are prepared synthetically. The synthetic sulfonates include alkyl sulfonates and alkaryl sulfonates. The alkaryl radical can be derived from benzene, toluene, ethyl benzene, xylene isomers, or naphthalene. Preferably, the alkyl groups are branched chain.

Mixtures of sulfonates derived from alkaryl hydrocarbons having straight-chain alkyl groups and alkaryl hydrocarbons having branched-chain alkyl groups, and wherein the amount of sulfonate derived from branched-chain alkaryl hydrocarbons is at least 40 percent by weight, are particularly suitable. Preferably, the amount of sulfonate derived from branched chain alkaryls is at least 60 percent by weight.

An example of an oil-soluble alkaryl sulfonate (a synthetic sulfonate) which has been particularly useful in preparing colloidal dispersions is the material known as postdodecylbenzene sulfonate. Postdodecylbenzene is a bottoms product of the manufacture of dodecylbenzene. The alkyl groups of postdodecylbenzene are branched chain. Post dodecylbenzene consists of monoalkylbenzenes and dialkylbenzenes in the approximate mole ratio of 2:3 and has typical properties as follows:

| | |
|---|---|
| Specific gravity at 38° C. | 0.8649 |
| Average molecular weight | 385 |
| Percent sulfonatable | 88 |
| A.S.T.M. D–158 Engler: | |
| I.B.P., °F. | 647 |
| 5° F. | 682 |
| 50° F. | 715 |
| 90° F. | 760 |
| 95° F. | 775 |
| F.B.P., ° F. | 779 |
| Refractive index at 23° C. | 1.4900 |
| Viscosity at: | |
| −10° C. centipoises | 2800 |
| 20° C. centipoises | 280 |
| 40° C. centipoises | 78 |
| 80° C. centipoises | 18 |
| Aniline point, ° C. | 69 |
| Pour point, ° F. | −25 |

An example of another oil-soluble synthetic alkaryl sulfonate, which is particularly useful for preparing colloidal dispersions, is the sulfonate derived from a sulfonation feedstock known as "dimer alkylate." "Dimer alkylate" has branched-chain alkyl groups as does postdodecylbenzene. Briefly described, dimer alkylate is prepared by the following steps:

(1) dimerization of a suitable feedstock, such as cat poly gasoline,
(2) alkylation of an aromatic hydrocarbon with the dimer formed in step (1).

Preferably, the dimerization step uses a Friedel-Crafts alkylation sludge as the catalyst. This process and the resulting product are described in application Ser. No. 367,417, filed May 14, 1964, now U.S. Pat. No 3,440,925 and having the same assignee as the present application. The term "cat poly gasoline," referred to in the foregoing, is described in detail in U.S. Pat. No. 3,410,925.

An example of still another oil-soluble synthetic alkaryl sulfonate, which is particularly useful for preparing colloidal dispersions, is the sulfonate derived from a sulfonation feedstock which I refer to as "NAB Bottoms." NAB Bottoms are predominantly di-n-alkaryl, wherein the alkyl groups contain from 8 to 18 carbon atoms. They distinguish primarily from the preceding sulfonation feedstocks in that they are straight-chain and contain a large amount of disubstituted material. The process of preparing these materials and the resulting product are described in application Ser. No. 521,794 filed Jan. 20, 1966, and having the same assignee as the present application. Another process of preparing a di-n-alkaryl product is described in application Ser. No. 529,284, filed Feb. 23, 1966 and having the same assignee as the present application.

Mixtures of sulfonates derived from "dimer alkylate" and "NAB Bottoms" are suitable for preparing the grease-like compositions used in my invention.

In order to make my disclosure even more complete, application Ser. Nos. 521,794 and 529,284 now U.S. Pat. No. 3,410,925 are made a part of this disclosure.

Other sulfonates which can be used in the colloidal dispersion employed as a starting material include, for example, mono- and poly-wax substituted naphthalene sulfonates, dinonyl naphthalene sulfonates, diphenyl ether sulfonates, naphthalene disulfide sulfonates, diphenyl amine sulfonates, dicetyl thianthrene sulfonates, dilauryl betanaphthol sulfonates, dicapryl nitro-naphthalene sulfonates, unsaturated paraffin wax sulfonates, hydroxy substituted paraffin wax sulfonates, tetraamylene sulfonates, mono- and poly-chloro-substituted paraffin wax sulfonates, nitrosoparaffin wax sulfonates; cyclo-aliphatic sulfonates, such as lauryl-cyclohexyl sulfonates, mono- and poly-wax substituted cyclohexyl sulfonates, and the like.

In addition, it is to be understood that the metal salts of the preceding sulfonates can be formed in situ during preparation of the colloidal dispersion by neutralization of the corresponding sulfonic acid.

Suitable carboxylic acids which can be used in preparing the colloidal dispersion used as a starting material include naphthenic acids, such as the substituted cyclopentane monocarboxylic acids, the substituted cyclohexane monocarboxylic acids and the substituted aliphatic polycyclic monocarboxylic acids containing at least 15 carbon atoms. Specific examples include cetyl cyclohexane carboxylic acids, dioctyl cyclopentane carboxylic acids, dilauryl decahydronaphthalene and stearyloctahydro indene carboxylic acids and the like and oil-soluble salts thereof. Suitable oil-soluble fatty acids are those containing at least 8 carbon atoms. For producing the colloidal dispersion in liquid form, I prefer fatty acids which are liquids at ambient temperatures down to about 15° C. Specific examples include 2-ethyl hexanoic acid, pelargonic acid, oleic acid, palmitoleic acid, linoleic acid and ricinoleic acid. Naturally occurring mixtures of predominantly unsaturated fatty acids, such as tall oil fatty acids, are particularly suitable.

In addition, it is to be understood that the metal salts of the preceding carboxylic acids can be formed in situ during preparation of the colloidal dispersion by neutralization of the corresponding carboxylic acid.

The phosphorus sulfide-treated olefins (by the term "olefins" I mean to include, also, olefin polymers, e.g. polyisobutylene) and their oil-soluble metal salts which are suitable for use include those customarily used in lubricating oil formulations as corrosion inhibitors and/or detergents. Specifically, they include the potassium-polyisobutylene-phosphorus sulfide products described by U.S. Pat. 2,316,080, issued on Apr. 6, 1943, to Loane and Gaynor, and a similar material containing no metal made by addition of a phosphorus sulfide to wax olefins, as described in U.S. Pat. 2,516,119, issued on July 25, 1950, to Hersh. This latter preferred material is made by first forming wax olefins from paraffin waxes by halogenation and dehydrohalogenation and subsequently treating the olefins with a phosphorus sulfide, preferably phosphorus pentasulfide. Another teaching of the preparation of phosphorus sulfide-treated olefins is U.S. Pat. 2,688,612, issued Sept. 7, 1954, to Watson.

Process conditions (Two-step method)

The grease-like composition used in my invention is prepared by treating the colloidal dispersion with a small amount of water in the presence of a small amount of an alcohol. From a practical viewpoint, the amount of water which is used should be at least about 3 percent, preferably about 7 percent, by weight, based on the colloidal dispersion. Preferably, I do not use above 12 percent, and usually not above 20 percent, by weight, of water based on the colloidal dispersion. (Larger amounts can be used conceivably, but no advantage results therefrom. Also, if an extremely long reaction time can be tolerated, an amount of water less than 3 percent might be used.) It should be noted that I have found that increasing the amount of water from 4 or 5 percent to about 7 or 8 percent provides a pronounced increase in rate of reaction.

The amount of alcohol which is used is in the range of about 0.5 to about 10 percent, preferably from about 2 to about 5 percent, by weight, based on the colloidal dispersion. These aforementioned amounts of alcohol include the residual alcohol present in the colloidal dispersion which runs from about 0.5 percent to about 3 percent by weight, usually.

It is apparent from the preceding that some colloidal dispersions have sufficient residual alcohol so that additional alcohol is not required. Sometimes, the use of additional alcohol will accelerate the reaction rate. Also, I have found that the amount of alcohol required varies with the type of dispersing agent, in that some dispersing agents require more alcohol than others. Furthermore, the alcohol which is added does not have to be the same species of alcohol which is present as the residual alcohol.

A wire variety of alcohols can be used in the conversion of the colloidal dispersion to the grease-like composition used in my invention. Examples of suitable alcohols include the $C_1-C_{10}$ alkanols, the monoether alcohols of ethylene glycol containing up to 8 carbon atoms, and the monoether alcohols of diethylene glycols containing up to 8 carbon atoms. Preferably, the alcohols have boiling points of at least about that of water. Examples of suitable alcohols include methanol, ethanol, propanol, isobutanol, amyl alcohol, hexanol, octanol, decanol, 2-methoxy ethanol, and 2-ethoxy ethanol. Of these isobutanol and 2-methoxy ethanol are preferred.

As is apparent from the preceding discussion, an important feature of the process of preparing the grease-like composition is the use of a combination of water and an alcohol to effect a modification reaction. By "modification reaction" is meant the change from a fluid, clear colloidal dispersion to a viscous, tacky material.

In the preparation of the composition, heat is applied to the admixture containing colloidal dispersion, water, alcohol (and, possibly, volatile solvent or nonvolatile diluent oil). The heat is applied until the modification reaction occurs which is apparent by a rapid change in viscosity of the reaction admixture. The modification reaction occurs at a temperature slightly above 170° F. Usually a temperature of 190–210° F. is sufficient to cause the reaction to go to completion rapidly.

Since the grease-like composition is to be used as a primer for paints, it is often convenient to conduct the modification reaction in the presence of a volatile solvent. When a volatile solvent is employed in the reaction admixture, the occurrence of the reaction is still visible in that the viscosity changes and the solution changes from a bright, clear solution to a hazy or cloudy solution. The temperature employed and the total amount of heat used are not critical in the two-step method. Knowing that heat effects the reaction and that the reaction can be observed, as a rapid change in consistency of the product, any person skilled in the art can readily, and without prolonged experimentation, determine the reaction temperature and the total amount of heat necessary.

While it is more convenient to prepare the grease-like composition in the presence of the volatile solvent, preferably, when the two-step method is used, the grease-like composition is formed first. Then the grease-like composition is dissolved in the required amount of solvent. Sometimes, it may be desirable to form a concentrate of the grease-like composition in the volatile solvent initially.

It is not necessary to remove the water and alcohol from the product. Generally, the heating which is conducted to effect the conversion results in some loss of water and alcohol. Heating beyond this is not necessary, although in some products it may be desirable to remove more of the water.

The following relationship exists between the acetic base number, amount of dispersing agent in the colloidal dispersion and the consistency (as measured by ASTM penetration at 77° F.) of the modified product. Decreasing the base number below 135 results in a decrease in the consistency of the product. Similarly, decreasing the amount of dispersing agent below 22 percent by weight in the colloidal dispersion results in an even sharper decrease in the consistency of the product. In view of the preceding, since the product is to be used as a paint primer, it is better to use colloidal dispersions having an acetic base number of at least 50, and preferably of at least 135. In addition, it is better to use colloidal dispersions containing at least 15 percent by weight dispersing agent and preferably at least 22 percent by weight dispersing agent. Furthermore, it is apparent from the preceding discussion that in order to maintain the required consistency in the modified product a decrease in either base number or amount of dispersing agent requires an increase in the other of the two materials.

It may be well to note that when the two-step method is used the particle size of the metal compound in the grease-like product is larger than in the colloidal dispersion. The particle size of the metal compound in the grease-like product can be as large as 0.4 micron.

It is to be understood that the concepts of (1) using a petroleum wax as a nonvolatile diluent and (2) use of a small amount of a nonvolatile diluent oil are not part of my invention. These concepts are disclosed and claimed in application serial number 727,720, filed May 8, 1968, and having the same assignee as the present application.

One-step method of preparation

Starting materials.—The nature and amounts of the starting materials, which are used to prepare the grease-like composition used in my invention, are shown in the following table:

| Material | Parts by weight | |
|---|---|---|
| | Suitable | Preferred |
| Nonvolatile diluent | 2-80 | 5-30 |
| Dispersing agent | 2-65 | 3-10 |
| Alkaline earth metal (present as alkaline earth metal-carbonate complex) | 2-40 | 10-30 |
| Water | 1-6 | 2-4 |
| Alcohol | 10-40 | 20-30 |
| Volatile solvent (optional [1]) | 0-60 | 25-45 |

[1] Previously, in discussing the process conditions for the two-step method we stated that a volatile solvent, which is used in applying the grease-like composition, can be present during the preparation. Preferably, however, in the two-step method the grease-like composition is prepared first and dissolved in the volatile solvent. In the one-step method we have found no advantage to first preparing the grease-like composition and then dissolving it. In view of this having the volatile solvent present during the preparation of the composition is a matter of choice dependent on other factors. The nature of the volatile solvent is described hereinafter.

It should be emphasized that the above-stated ranges apply solely to the one-step process of preparing the grease-like composition. The ranges differ from those given hereinafter for the composition per se, primarily, due to the inclusion of volatile materials. For this reason the ranges are stated solely to illustrate the process. Insofar as the above-stated ranges differ from those given for the grease-like composition per se my invention is limited only to the ranges stated for the composition.

Suitable and preferred nonvolatile diluent, dispersing agent and alkaline earth metal are the same as described previously in connection with the two-step method.

An alkaline earth metal-carbonate complex, which is formed in situ, is used in the process. In forming the complex, an admixture is prepared of alkaline earth metal basic compound, selected from the group consisting of oxides, hydroxides, and alcoholates, dispersing agent, nonvolatile diluent, and alcohol. The admixture is then treated with $CO_2$ to form the carbonate complex. Alternatively and preferably, the alkaline earth metal-carbonate complex is formed by adding an alcoholic slurry of the alkaline earth metal basic compound to an admixture of the other materials. The total admixture is then treated with $CO_2$ to form the carbonate complex.

The selection of the alcohol used in preparing the complex is important, in that a monohydric aliphatic alcohol containing from 1 to 3 carbon atoms should be used. Preferably, the alcohol is methanol. After the complex has been formed, in order to convert the reaction mass to a grease-like composition, any of the alcohols described in connection with the two-step method can be used.

Process conditions

In carrying out the one-step method, the oil soluble dispersing agent (whether pre-formed, or formed in situ), nonvolatile diluent and alcohol-alkaline earth metal basic compound slurry are intimately admixed preparatory to carbonation. The water component of the mixture may be added at any time prior to the final controlled heating step, and may be added at different times in two or more increments, if desired. The same is true of any alcohol which is added in addition to that introduced with the slurry. In the case of the water, however, it is preferred to add the entire amount of water at the outset and prior to carbonation since thicker products appear to be yielded when this procedure is followed.

In carrying out the carbonation of the mixture to form the carbonate complex, at least about 1.5 moles of carbon dioxide must be introduced to the mixture for each mole of alkaline earth metal present. In addition, the gas necessary to complete carbonation (as described) must be introduced to the mixture within 75 minutes in order to obtain the high viscosity grease-like product sought, and it is preferred that this amount be introduced at a sufficient rate to achieve completion of carbonation and formation of the complex within from 20 to 40 minutes.

The carbon dioxide required may be introduced into the mixture by blowing or bubbling the gas through the mixture, or by immersing Dry Ice in the mixture. The reaction is exothermic and its progress can be followed by observation of the change in temperature of the reaction mixture. It is preferred that the temperature be retained below about 50° C. during carbonation.

Upon completion of carbonation, the mixture, which then contains the oil-soluble dispersing agent, the nonvolatile carrier material, and the alkaline earth metal-carbonate complex resulting from carbonation is subjected to a controlled heating step. Between the carbonation procedure and the heating step, water and/or alcohol may be added to the mixture in order to bring the total content of these two components in the mixture up to that which has been hereinbefore described as the operative requirements in this respect. The heating step with which the one-step method is concluded is quite important, and the manner in which it is conducted determines whether the desired high consistency-low penetration grease-like compositions are yielded, or whether a fluid dispersion of the general type described in U.S. Pats. 2,956,018 and 2,861,951 to Carlyle and also in U.S. Pats. 3,150,088 and 3,027,325 to McMillen are formed.

In the final heating step of the process, two objectives are sought by the heating. First, the light solvents must be stripped from the mixture, except, perhaps, for small amounts of water and alcohol and such light hydrocarbon carrier material as it is desired to have remain in the final product for purposes of enhancing the ease of processing. Thus, the heating will remove substantially all of the alcohol and water which are not consumed in the grease producing reaction, and any very light hydrocarbon solvents, such as hexane, which are incorporated in the mixture in order to facilitate the carbonation of the alkaline earth metal base compound.

The second function of the heating is to supply the heat of reaction which is necessary to effect the conversion of the mixture to a high consistency grease-like composition. The mechanism by which such conversion to the viscous, tacky product occurs is not thoroughly comprehended, but apparently entails decomposition of the carbonate complex to form alkaline earth metal carbonate compounds which are homogeneously dispersed in the grease-like product. The precise role played by the water in this conversion is not known, but its presence is essential and, moreover, it is necessary that a certain minimum amount of the water be present over a certain period of time in order to effect the conversion.

To then describe the specific parameters which are critical in the heating of the heterogeneous mixture which exists after carbonation in order to form the described grease-like compositions, it is necessary that the mixture be heated to a temperature above about 50° C.

After reaching the threshold temperature of about 50° C. for effecting the conversion reaction, it is then desirable to gradually increase the temperature of the reaction mixture to above 100° C., and preferably ultimately to about 160° C. This is because water in the mixture commences to be stripped or driven off at 100° C., and the total processing time becomes unacceptably long when temperatures exceeding this level are never attained during the final heating step. On the other hand, it is critical to the formation of the desired grease products that the temperature zone of 50° C. to 100° C. not be traversed too rapidly. The effect of increasing the temperature of the mixture at an excessive rate is to drive an excessive amount of the water from the mixture before it has had an opportunity to enter into the reaction necessary to convert the mixture to grease. From this it follows that the greater the amount of water in the mixture within the operative range of water content hereinbefore described, the higher may be the rate at which the temperature is raised from 50° C. to 100° C.

A definite relationship exists between the amount of water in the heated mixture and the time required to traverse the temperature zone of from 50° C. to 100° C. For example, where the minimum operative quantity of water is present in the mixture at the inception of the final heating step (that is, 0.25 mole of water per mole of overbasing alkaline earth metal present), the time within which the mixture must be maintained between 50° C. and 100° C. is at least 4.5 hours. This time period decreases in a fairly regular uniform fashion as the amount of water present in the mixture with respect to the amount of alkaline earth metal present increases. Thus, when a water level of about 2.5 moles of water per mole of alkaline earth metal is reached, a time period of only about 45 minutes in the temperature range of 50° C. to 100° C. is required in order to effect the desired conversion to the grease-like product. At this and higher water levels, the time requirement to effect the desired conversion drops off very sharply so that the reaction mixture may be heated from 50° C. to 100° C. at as rapid rate as may be desired. This relationship between the transition time for elevating the temperature of the reaction mass from 50° C. to 100° C. in instances where the water content of the reaction mixture is in the range of from about 0.25 mole of water per mole of alkaline earth metal (present in an overbasing capacity) to about 2.5 moles of water per mole of the metal can be approximated by the expression:

$$t = 0.75 + 1.7 \times (2.5 - m)$$

where $t$ equals the time in hours within which the mixture must be retained in the temperature range of between 50° C. and 100° C. and $m$ is the number of moles of water present in the mixture per mole of alkaline earth metal present in the mixture in an overbasing capacity.

Where the reaction mixture is heated too rapidly to above 100° C., the water apears to be stripped from the mixture too fast to permit the completion of reaction. The result then is that there is formed a homogeneous dispersion of alkaline earth metal carbonate which is quite fluid and is similar to the lubricating oil additives which are yielded by the processes described in U.S. Patents 2,956,018 and 2,861,951 to Carlyle and also in U.S. Patents 3,150,088 to Hunt.

The formation of the desired grease-like product is clearly evidenced by the marked and rapid change in the observable physical properties of the mixture. The most striking change, perhaps, is in the viscosity of the mixture, which increases rapidly as the conversion to grease-like product occurs. The grease-like product is tacky and opaque and is macroscopically homogeneous. It is highly basic in terms of its acetic base number. (This term is well-known in the art, being described in U.S. 3,150,088.)

As the starting mixture undergoes conversion or modification to yield the grease-like product, it will often be desirable to add a volatile solvent to the mixture in order to maintain its viscosity within a manageable range.

In the heating step, it is not necessary to remove all of the water and alcohol from the mixture, particularly where the product is to be used as a paint primer.

It is to be understood that the one-step method of preparing the grease-like composition is not part of my invention. This method is disclosed and claimed in application Ser. No. 727,719 filed May 8, 1968 and having the same assignee as the present application. In order to make my disclosure more complete this application is made a part of this disclosure.

Description of the grease-like composition

The grease-like composition, used in my invention, consists essentially of the following materials in the amounts stated:

|  | Parts by weight | |
| --- | --- | --- |
|  | Suitable | Prefrred |
| Nonvolatile diluent | 2–80 | 30–60 |
| Oil-soluble dispersing agent | 5–55 | 15–30 |
| Basic alkaline earth metal compound | 1–45 | 3–35 |

The materials listed above conform to the definitions stated in the description of the two-step method of preparation.

The grease-like composition has the following properties:

It is thixotropic.[1]
An acetic base number of at least 50, preferably at least 135
Dropping point, ASTM, of at least 480° F.
Does not flow at 210° F.[2]

---

[1] Another way of stating this property is that the composition has no apparent viscosity at 210° F. In other words, the viscosity cannot be measured.
[2] By this is meant the composition is thixotropic in solutions which are fluid at room temperature (about 70–75° F.). Thus, a solution of the composition in some lighter lubricating oils is thixotropic. Particularly, solutions of the grease-like composition in volatile hydrocarbon solvents (e.g., Stoddard solvent) are thixotropic.

The composition, used in my invention, differs from the usual dispersions in its physical properties.

The term "grease-like" has been used throughout the description of my invention since the composition is used as a primer for paints, not as a grease. Actually, many of the compositions falling within my description are suitable for use as greases.

Application of the grease-like composition to metal surfaces

The grease-like composition can be applied "as is" to the metal surface, usually, by means of a brush. Preferably, the composition is diluted in a volatile solvent for application to the surface. The use of a volatile solvent provides a more uniform film on the metal surface and enables the use of a spray. The latter can reduce substantially the cost of applying the composition.

The nature of the volatile solvent used is not a salient feature of my invention, and it is believed those skilled in the art, without undue experimentation, can readily ascertain suitable solvents. Examples of suitable solvents include volatile hydrocarbon solvents, such as Stoddard solvent, kerosene, petroleum naphtha and the like. Also, certain nonflammable chlorohydrocarbons are suitable. For reasons of safety, it is preferable to use solvents having a flash point of at least 100° F. and even higher. The amount of solvent is dependent on the particular method of application. Usually, a suitable amount of solvent is in the range of from about 40 to about 90 percent by weight. Preferably, it is from about 50 to about 80 percent by weight.

The grease-like composition can be used as a primer on any type of metal surface which is to be coated with a conventional paint. Preferably it is used on metals which are subject to severe corrosion, such as ferrous metals.

A particular advantage of the grease-like composition used in my invention is that the metal surface requires little or no preparation prior to application. Many primers require that the surface be meticulously clean (e.g. by chemical cleaning or sand-blasting to white metal) prior to application. By contrast, the grease-like composition, used in my invention, when applied to rusted surfaces result in a satisfactory film. Usually, the surface is treated moderately, e.g. by scraping or brushing sufficiently to remove loose scale prior to application of the grease-like composition.

The amount of grease-like composition which is applied can be readily determined by those skilled in the art. A thicker film usually provides better protection but, obviously, is more expensive. A film having a thickness of about 2.5 mils has been found to be optimum with respect to both performance and economics.

The grease-like composition should be substantially solvent-free before applying the conventional paint. Usually, the composition is solvent-free in 24–72 hours.

Suitable paints

A variety of conventional paints have been found to be satisfactorily applied over the grease-like composition. Examples of suitable generic-type paints include the following:

Amine cured epoxy (2 component)
Polyamide cured epoxy
Urethane (2 component)
Alkyd enamel
Phenolic enamel
Acrylic water emulsion
Vinyl Knowing that the grease-like composition described herein is satisfactory as a primer for conventional paints anyone skilled in this art can readily select a suitable paint for the outer surface. Similarly, the selection of a paint to provide optimum results can be made readily.

Advantages of my invention

As indicated previously, a primary advantage of the use of the grease-like composition as a primer is that the metal surface requires little, or no, preparation prior to being coated with the composition.

Secondly, use of the grease-like composition as a primer provides an improved resistance to corrosion of metal surfaces.

Thirdly, use of the grease-like composition as a primer permits an increase in the thickness of a single-coat film, particularly with alkyd paints.

In order to disclose the nature of the present invention still more clearly, the following illustrative examples will be given. It is to be understood that the invention is not to be limited to the specific conditions or details set forth in these examples except insofar as such limitations are specified in the appended claims.

Example 1.—This example illustrates the preparation of the grease-like composition in a volatile solvent by the one-step method.

| Charge: | G. |
|---|---|
| Stoddard solvent | 2,000 |
| Sulfonic acid derived from "dimer alkylate" | 1,050 |
| Sulfonic acid derived from "NAB bottoms" | 477 |
| 100 pale oil (a solvent refined, Mid-Continent lubricating base stock having a viscosity of 100 S.S.U.) | 364 |
| Water | 10 |

The above-listed materials were charged to a 12-liter, 3-necked, creased flask. While stirring the admixture a slurry of the following was added:

| | G. |
|---|---|
| $Ca(OH)_2$ | 345 |
| Methyl alcohol | 1587 |

The admixture was then blown with $CO_2$, using a setting of 5 (397 cc./min.) on the flow meter. The temperature of the admixture was observed carefully. When the temperature had peaked (49.5° C.—after 32 minutes of blowing) and started to drop the setting on the $CO_2$ flow meter was reduced to 2.5 (198 cc./min.). Total time of blowing with $CO_2$ was 52 minutes.

Upon completion of the addition of the $CO_2$ the admixture was stirred for 1 hour (at 40° C.). The admixture was then heated to reflux temperature (58° C.) and refluxed for 30 minutes. It was then cooled to 50–55° C. and 140 g. of water was added over a 15 minute period. The admixture was heated to reflux temperature (58° C.) and maintained there for 1 hour. The solvents were removed by heating to 160° C. The resulting product amounted to 3,032 grams. To this was added 388 g. of Stoddard solvent to bring the total amount of product to 3420 g. The resulting product contained 69% (wt.) Stoddard solvent and 31% (wt.) nonvolatiles.

Example 2.—This example illustrates the use of the composition of Example 1 as a primer for conventional paints.

Cold rolled, mild steel, type R–48, "Q" panels (manufactured by the Q Panel Corporation, Cleveland, Ohio), size 4" x 8" x 0.032", were dipped in the product of Example 1. They were then allowed to dry for approximately 72 hours. The thickness of the dried film was about 2.5 mils.

Each of the panels was coated with one coat of a conventional paint, using conventional pneumatic paint spraying equipment. A variety of conventional paints was used in the test. The coated panels were scored with an x, then exposed for 502 hours to salt fog using ASTM Method B–117 (95° F., 95–100% relative humidity, 5 wt. percent NaCl brine).

The results are shown below:

| Paint | Generic paint description | Dry paint film thickness, mils | Salt fog data 48-hour drying [1] | Rust count index of cleaned panel [2] | Condition of paint film [3] |
|---|---|---|---|---|---|
| A | Amine cured epoxy white (2 component) | ~1.8 | S [4] | 1 | Good. |
| B | Urethane white (2 component) | ~2.5 | D | 0 | Do. |
| C | Alkyd enamel white | ~2.5 | S [4] | 4 | Do. |
| D | Phenolic black enamel | ~0.8 | D | 0 | Do. |
| E | Acrylic water emulsion white | ~2.5 | D | 73 | Fair. |
| F | Vinyl white | ~1.5 | D | 8 | Good. |

[1] S=Non-tacky, but soft-to-touch; D=dry and hard.
[2] The number of ½" x ½" squares out of a total of 98 squares in which a rust spot of any size is visible to the naked eye.
[3] Refers to blistering, cracking or loss of adhesion.
[4] These films were dry and hard after 72 hours.

As a basis for comparison, an uncoated panel will rust to a rating of 98 in less than 24 hours in the salt fog cabinet.

To provide a basis for comparison a control test was run in which the Q panels were coated with the paint, but not with the primer of Example 1.

The results were as follows:

| Paint | Paint film thickness, mils | 48-hour drying | 502 hr. salt fog data Rust count index of cleaned panel | Condition of paint film | Remarks |
|---|---|---|---|---|---|
| A | 1.8 | D | ≥10 | Good | Slight adhesion loss. |
| B | 2.5 | D | 98 | Poor | Complete adhesion loss. |
| C | 2.5 | D | 98 | ...do | Blistered. |
| D | 0.8 | D | 90 | ...do | Blistered and wrinkled. |
| E | 2.5 | D | 98 | ...do | Blistered. |
| F | 1.5 | D | 95 | ...do | Do. |

Example 3.—This example illustrates the use of the grease-like composition as a primer on rusted surfaces.

A heavily rusted mild steel coupon was dipped in the product of Example 1. After allowing the coupon to dry there was about a 2.5 mil film of the grease-like composition on the coupon. The coated coupon was then sprayed with the two component epoxy white enamel of Example 2. The epoxy film dried soft-to-touch in 48 hours and hard in 72 hours with no blistering or cracking of the film.

Example 4.—This example illustrates the preparation of the grease-like composition, used in my invention, having a petroleum wax as the diluent.

The procedure used was substantially the same as that used in Example 1.

The materials used were as follows:

|  | G. |
|---|---|
| Stoddard solvent | 2,000 |
| Sulfonic acid derived from "dimer alkylate" | 1,050 |
| Sulfonic acid derived from "NAB bottoms" | 477 |
| Crude microwax, having the following specifications: Melting point,[1] minimum—170° F., percent oil, maximum—3%, needle penetration, 40–85 | 364 |
| Water | 10 |
| Ca(OH)$_2$ | 345 |
| Methyl alcohol | 1,587 |

[1] Dropping point—ASTM-127.

The resulting product amounted to 3,037 grams. To this was added 383 g. of Stoddard solvent to bring the product to 3,420 g.

Example 5.—This example illustrates the use of the composition of Example 4 as a primer for a conventional paint.

Two clean steel panels, as used in Example 2, were sprayed with the product of Example 4. Upon drying a film having about 1 mil thickness was present on the panels.

One panel was sprayed with the two component epoxy white enamel of Example 2. Upon drying the epoxy film had a thickness of about 1.8 mil. The second panel was sprayed with the water-base acrylic emulsion of Example 2. Upon drying the panel had a paint film thickness of about 2.5 mils.

After 48 hours, the coatings of both panels were dry and hard with no blistering or cracking. The product of Example 4 showed the following improvements over the product of Example 2. The film was much harder, less tacky, and had improved resistance to mechanical abuse. In addition, the weatherability was better than that of Example 2.

Example 6.—This example illustrates the preparation of the grease-like composition, used in my invention, by the two-step method.

The starting material was an overbased calcium sulfonate having an acetic base number of about 300 and being prepared by the process of U.S. Pat. No. 3,150,088.

The overbased calcium sulfonate (800 lbs.) was added to a grease-plant kettle and heated to 185° F. Water (80 lbs.) and methoxy ethanol (4 lbs.) were added and the temperature raised to 200° F. After 50 minutes of reflux the kettle covers were opened to permit escape of volatile components. The temperature was raised to 360° F. over a period of about 1½ hours, with samples being taken periodically to check core penetration. The penetration (ASTM at 77° F.)=temperature data is shown below:

| Temperature, ° F.: | Ambient penetration |
|---|---|
| 250 | 129 |
| 310 | 130 |
| 320 | 145 |
| 360 | 155 |

The hot, finished product (677 lbs. net) was pumped from the bottom of the kettle into 4–400 lb. drums.

The grease-like product was dissolved in Stoddard solvent by means of direct mixing. A Cowles Dissolver was used to break up the grease cake (in the drum), followed by recirculation through a gear-drive pump to complete dissolution. Sufficient Stoddard solvent was used to prepare a product containing 40% (wt.) nonvolatiles.

Example 7.—This example illustrates the use of the grease-like product of Example 6 as a primer.

A lightly rusted panel, similar to that used in Example 2, was coated with the product of Example 6. The thickness of the dried film was about 2.5 mils. The white alkyd enamel of Example 2 was sprayed on the coated coupon. The alkyd resin dried hard in less than 30 hours (film thickness—about 4 mils) with good film adhesion and no blistering or cracking.

Example 8.—This example illustrates the preparation of a grease-like product having a low nonvolatile diluent content by the two-step method.

(A) Preparation of overbased calcium sulfonate in Stoddard solvent.

Charge:

| | G. |
|---|---|
| 90% active sulfonic acid derived from a 70/30 blend of "dimer alkylate" and "NAB bottoms" | 1038 |
| Stoddard solvent | 1200 |
| n-Hexane | 300 |
| 70/30 water-methoxy ethanol azeotrope | 39 |

The above-listed materials were added to a 12-liter, 3-necked, creased flask. The acid was neutralized by adding to the reaction vessel 492 grams of a methoxy ethanolic solution of calcium methoxy ethoxide-carbonate complex (containing 7.39% Ca and 7.88% $CO_2$). The addition was at a pot temperature of 30–40° C. in about 15 minutes time.

To the reaction vessel the following materials were added concurrently:

4568 g. of the above-mentioned Ca methoxy ethoxide-carbonate complex (in 60 minutes)

741 g. of the above-mentioned azeotrope (in 48 minutes)

The temperature was 39–41° C. during the addition.

The solvents were removed overhead by heating to a pot temperature of 150° C. for about 3½ hours. Stoddard solvent (400 g.) was added during this time to keep the product fluid. The product was blown with $CO_2$ at 150° C. for 10 minutes. The product weight was 2305 grams. Sufficient Stoddard solvent was added to bring the product weight to 3,000 grams. The product had an acetic base number of 310.

(B) Preparation of overbased calcium sulfonate in Stoddard solvent.

Charge:

| | G. |
|---|---|
| 90% active sulfonic acid (same as in A) | 1211 |
| Stoddard solvent | 1500 |
| n-Hexane | 350 |
| 70/30 water-methoxy ethanol azeotrope | 45 |

The procedure was the same as in (A).

574 g. of methoxy ethanolic solution of Ca methoxy ethoxide-carbonate was used for neutralization.

5329 g. of Ca methoxy ethoxide-carbonate and 864 g. of azeotrope were used for overbasing.

The product weight was 2930 grams. Sufficient Stoddard solvent was added to bring the product weight to 3500 g. The product had an acetic base number of 308.

(C) Preparation of low nonvolatile diluent content grease-like composition in Stoddard solvent.

Charge:

| | G. |
|---|---|
| Overbased Ca sulfonate—(A) | 400 |
| Overbased Ca sulfonate—(B) | 1600 |
| Water | 200 |
| Methoxy ethanol | 20 |

The above-listed materials were added to a Hobart mixer. The admixture was heated to reflux and stirred for 1 hour. The water and methoxy ethanol were removed by heating to about 300° F., using house vacuum. The product weight was adjusted to 2000 grams using Stoddard solvent. Product was a gray colored semi-solid.

Additional Stoddard solvent was added to produce a product containing 40% non-volatiles.

Example 9.—This example illustrates the use of the product of Example 8 as a primer.

Two steel panels, similar to those used in Example 2, were coated with the product of Example 8. The thickness of the dried film was about 1 mil. One panel was then sprayed with the two-component amine cured epoxy white. The second panel was sprayed with the acrylic water emulsion (white). The films on both painted panels were dry and hard after 48 hours with no blistering or cracking.

Example 10.—This example illustrates the use of the grease-like composition, prepared by the two-step method, as a primer for conventional paints.

The composition used in this example was a Stoddard solvent solution of a composition substantially the same as that of Example 6. Metal coupons were coated with the composition and allowed to dry for 2 days. The coated coupons were then coated with an epoxy paint and allowed to dry. The finished coupons were immersed in boiling brine for several hours. Upon examination the coating appeared to provide satisfactory protection.

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

The invention having thus been described, what is claimed and desired to be secured by Letters Patent is:

1. Method of improving resistance to corrosion of metal surfaces wherein the method comprises:
   (a) applying to the metal surface a grease-like primer composition consisting essentially of:
      (1) from about 2 to about 80 parts by weight of a nonvolatile diluent selected from the group consisting of mineral lubricating oils, synthetic lubricating oils and petroleum waxes,
      (2) from about 5 to about 55 parts by weight of an oil-soluble dispersing agent, and
      (3) from about 1 to about 45 parts by weight of a basic alkaline earth metal compound, said composition being characterized further in that it has an acetic base number of at least 50, is thixotropic, does not flow at 210° F., and has a dropping point of at least 480° F.,
   (b) allowing the coated metal surface to become substantially free of any volatile solvent which may be present, and
   (c) applying to the coated metal surface a conventional paint wherein said paint adheres to said primer.

2. The method of claim 1 wherein the alkaline earth metal compound, present in the grease-like composition, is selected from the group consisting of calcium and barium compounds.

3. The method of claim 2 wherein the oil-soluble dispersing agent is a sulfonic acid, or metal sulfonate thereof.

4. The method of claim 3 wherein the oil-soluble dispersing agent is a synthetic alkaryl sulfonic acid, or metal sulfonate thereof, at least 40 percent by weight of which is derived from branched-chian alkaryl hydrocarbons.

5. The method of claim 4 wherein the alkaline earth metal is calcium.

6. The method of claim 5 wherein the nonvolatile diluent is a mineral lubricating oil.

7. The method of claim 6 wherein the conventional paint is selected from the group consisting of two-component amine cured epoxy, two-component urethane, alkyd enamel, phenolic enamel, acrylic water emulsion, and vinyl.

8. The method of claim 5 wherein the nonvolatile diluent is a microcrystalline wax.

9. The method of claim 8 wherein the conventional paint is selected from the group consisting of two-component amine cured epoxy, two-component urethane, alkyd enamel, phenolic enamel, acrylic water emulsion, and vinyl.

10. The method of claim 1 wherein the grease-like composition consists essentially of:
   (a) from about 30 to about 60 parts by weight of said monovolatile diluent, (b) from about 15 to about 30 parts by weight of an oil-soluble dispersing agent selected from the group consisting of sulfonic acids and metal sulfonates, (c) from about 3 to about 35 parts by weight of a basic alkaline earth metal compound the cation of said compound being selected from the group consisting of calcium and barium, said composition being characterized further as having an acetic base number of at least 135.

11. The method of claim 10 wherein the alkaline earth metal is calcium.

12. The method of claim 11 wherein the oil-soluble dispersing agent is a synthetic alkaryl sulfonic acid, or metal sulfonate thereof, at least 60 percent by weight of which is derived from branched-chain alkaryl hydrocarbons.

13. The method of claim 12 wherein (1) the grease-like composition is in a volatile solvent while being applied to the metal surface and (2) said grease-like composition is substantially free of said volatile solvent before applying the conventional paint.

14. The method of claim 13 wherein the nonvolatile diluent is a mineral lubricating oil.

15. The method of claim 13 wherein the nonvolatile diluent is a microcrystalline wax.

16. A method of coating a substrate which comprises:
(a) applying to the substrate a grease-like primer composition consisting essentially of:
 (1) from about 2 to about 80 parts by weight of a nonvolatile diluent selected from the groups consisting of mineral lubricating oils, synthetic lubricating oils and petroleum waxes,
 (2) from about 5 to about 55 parts by weight of an oil-soluble dispersing agent, and
 (3) from about 1 to about 45 parts by weight of a basic alkaline earth metal compound, said composition being characterized further in that it has an acetic base number of at least 50, does not flow at 210° F., has a dropping point of at least 480° F. and is thixotropic,
(b) allowing the coated substrate to become substantially free of any volatile solvent which may be present, and
(c) applying to the coated surface of the substrate a conventional paint wherein said paint adheres to said primer, 17. The method of claim 16 wherein (1) the alkaline earth metal compound is a calcium compound, and (2) the oil-soluble dispersing agent is a calcium sulfonate.

18. The method of claim 17 wherein the nonvolatile diluent is a mineral lubricating oil.

19. The method of claim 17 wherein the nonvolatile diluent is a microcrystalline wax.

20. The method of claim 16 wherein the grease-like composition consists essentially of:

(a) from about 30 to about 60 parts by weight of said nonvolatile diluent, (b) from about 15 to about 30 parts by weight of an oil-soluble dispersing agent which is a calcium sulfonate, (c) from about 3 to about 35 parts by weight of a basic calcium compound, said composition being characterized further as having an acetic base number of at least 135.

21. The method of claim 20 wherein the nonvolatile diluent is a mineral lubricating oil.

22. The method of claim 21 wherein the conventional paint is selected from the group consisting of two-component amine cured epoxy, two-component urethane, alkyd enamel, phenolic enamel, acrylic water emulsion, and vinyl.

23. The method of claim 20 wherein the nonvolatile diluent is a microcrystalline wax.

24. The method of claim 23 wherein the conventional paint is selected from the group consisting of two-component amine cured epoxy, two-component urethane, alkyd enamel, phenolic enamel, acrylic water emulsion, and vinyl.

25. A metal article, one surface of which has been coated with a primer composition and a conventional paint adhered to said primer, said primer composition consisting essentially of:
(1) from about 2 to about 80 parts by weight of a nonvolatile diluent selected from the group consisting of mineral lubricating oil, synthetic lubricating oil and petroleum waxes,
(2) from about 5 to about 55 parts by weight of an oil-soluble dispersing agent, and
(3) from about 1 to about 45 parts by weight of a basic alkaline earth metal compound, said primer composition being characterized further in that it has an acetic base number of at least 50, does not flow at 210° F., is thixotropic and has a dropping point of at least 480° F.

References Cited
UNITED STATES PATENTS

| | | | |
|---|---|---|---|
| 2,758,981 | 8/1956 | Cooke et al. | 252—39X |
| 2,834,691 | 5/1958 | Stephenson et al. | 117—75X |
| 3,084,066 | 4/1963 | Dunmire | 117—75 |
| 3,242,079 | 3/1966 | McMillen | 252—33 |
| 3,443,982 | 5/1969 | Kjellmark | 117—75 |
| 3,445,298 | 5/1969 | Rucoba et al. | 252—389X |

WILLIAM D. MARTIN, Primary Examiner

R. HUSACK, Assistant Examiner

U.S. Cl. X.R.

117—72, 92, 132; 252—33, 389